Aug. 30, 1960  A. MEIXNER  2,950,665
SHUTTER FOR PHOTOGRAPHIC CAMERAS
Filed Jan. 17, 1957  5 Sheets-Sheet 1

INVENTOR
ALFRED MEIXNER

BY
Mock & Blum
ATTORNEYS

INVENTOR
ALFRED MEIXNER

Aug. 30, 1960 A. MEIXNER 2,950,665
SHUTTER FOR PHOTOGRAPHIC CAMERAS
Filed Jan. 17, 1957 5 Sheets-Sheet 4

INVENTOR
ALFRED MEIXNER
BY
Mocker Blum
ATTORNEYS

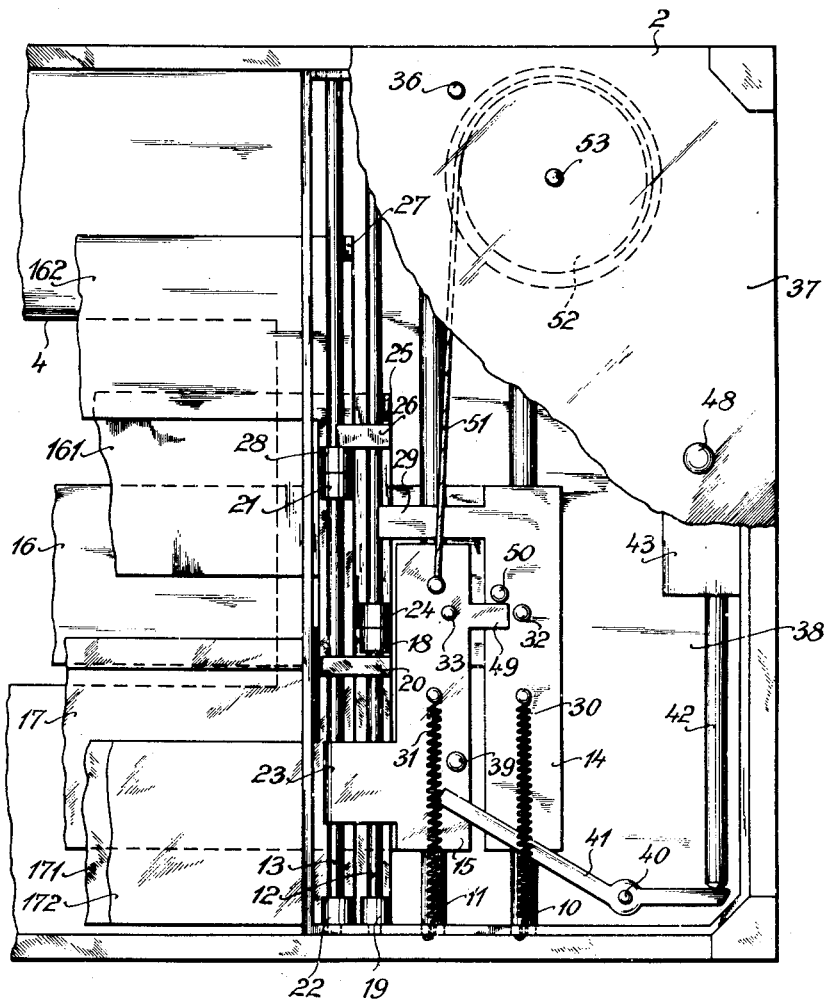

United States Patent Office 2,950,665
Patented Aug. 30, 1960

2,950,665

SHUTTER FOR PHOTOGRAPHIC CAMERAS

Alfred Meixner, Braunschweig, Germany, assignor to Voigtlander A.G., Braunschweig, Germany, a corporation of Germany Filed Jan. 17, 1957, Ser. No. 634,660

Claims priority, application Germany Jan. 25, 1956

4 Claims. (Cl. 95—55)

This invention relates to a shutter for photographic cameras and it has particular relation to focal-plane or slit-type shutters, in which an exposure opening is exposed by a roller blind, curtain or slide, and is subsequently shut after a predetermined adjustable period of time.

In order to fully utilize the advantages and particular characteristics of photographic shutters of the above mentioned type, it is necessary that the plane in which movement of the shutter parts takes place be located as closely as possible to the light-sensitive layer to be exposed. For this reason, such shutters are in general arranged or built-in in close and direct vicinity to the picture windows. In most cases they form a structural unit with the camera body. The individual parts of shutters of the above mentioned type are thereby arranged in the camera body and the guide paths for the shutter curtains or slides are also arranged therein. This has the disadvantage that the slit-type shutters must be mounted into the camera body which, of course, has to house also various other parts for carrying out camera functions, such as means for transport of the film, parts of locking means, range finders, view finders, and the like. The mounting of so many small parts within the camera body is difficult and troublesome. If there is any trouble later in connection with the shutter, it is in most cases necessary to remove first other members before the parts of the shutter are accessible to repair work.

It has been known to provide plate or film holders which can be attached to photographic cameras, with built-in slit-type shutters. In such a case the shutter forms with the casing of said holder—which contains holding, switching and guide means for a film or plate—a structural unit so that the conditions of mounting and for the repair of the shutter are not substantially better than in cameras having a slit-type shutter built-in in the camera casing.

A slit-type shutter which is built-in in the camera casing and can be applied like a sun shield to the front of an objective and attached to the mount thereof, has also been known. However, this type of shutter and its arrangement on the objective cannot be satisfactorily used in the case of short shutter times which can be attained only with shutters, in which slit formation takes place.

The main object of the present invention consists in providing a slit-type or focal-plane shutter which is a structural unit closed in itself, complete and fully operable and can be inserted as such in any desired camera body. Other objects will be apparent from the following specification and the appended claims and drawings.

It will be understood from the following disclosure and the appended drawings, that the shutter embodying the present invention can be mounted as an individual part entirely by itself, checked for the reliability of its operation and subsequently inserted in a camera casing, in which it can be fastened for example by means of a few screws. If a repair becomes necessary, the shutters according to the invention can be separated from the camera body in simple manner and another slit-type shutter can be substituted, if desired. Thus, merely a corresponding recess for the mounting plate or for the casing of the shutter has to be provided for in the camera body. This recess is arranged, in conformity with the specific character of the shutter, at a spot of the camera body, at which the light-sensitive layer is located during exposure. It is, therefore, of particular advantage to arrange all operative parts of the shutter according to the invention in a casing which can be inserted in the camera casing, whereby said casing is simultaneously provided with the picture window and—on its outer wall—a guide and bearing surface for the light-sensitive layer, e.g. a roll film. The casing which contains parts of the shutter, can be arranged without particular difficulty in the camera body in such a manner that the wall which is provided with said guide and bearing surface for the light-sensitive layer, will occupy an exactly adjusted position relative to the camera objective. The parts of the slit-type shutter, which form the shutter opening, are guided on the inner surface of the wall of said casing. Thereby, the plane of operation of said parts will be spaced only little farther from the light-sensitive layer, than the thickness of this wall, so that the desirable position of these shutter parts close to the light-sensitive layer will be present also in such built-in shutters according to the invention. However, it is also possible to arrange the picture-window and the guide and bearing surface for the light-sensitive layer in a plate or the like and to fasten such plate as a separate part on the mounting plate or on the shutter casing.

If the parts of the slit-type shutter are not housed in a casing and if they are arranged on a mounting plate which can be inserted in the camera, the picture window and the guide and bearing surfaces for the light-sensitive layer can be located also on the walls of the camera casing.

In connection with the mounting of the slit-type shutter and for its building in in the camera, it is of advantage if the casing containing the parts of the slit-type shutter is designed in such a manner that the picture window is unilaterally located in it. Thereby the mechanism of the shutter can be arranged with advantage on one side of the shutter casing, i.e. on the side which beside the picture window offers the most space therefor. The mechanism which is thus unilaterally arranged in the form of a structural unit in the shutter casing, is preferably enclosed by a part of the shutter casing which has the form of a small box. In this manner the sensitive operative parts of the shutter are protected from damage and being soiled when the shutter is not built-in yet in the camera casing, e.g. during storage. The beforementioned small box can also form a separate part which can be attached to the casing of the slit-type shutter so that the operative parts can be inserted in the form of assembled units into the casing of the shutter. The guide means for the members for opening and closing the picture window can be arranged with advantage in or on said small box containing the shutter mechanism. It is of advantage to arrange these organs only along that side of the picture window which is turned toward said small box, i.e. not to arrange them also on the other side of the picture window, because in this manner the dimensions of the shutter casing can be kept small. This small box can be provided, if desired, with one or more slots for the passage of the guided shutter organs. The guide path for the organs for opening and closing the picture window is arranged, in the case of a rectangular picture window, along one narrow side of the picture window, especially in view of the fact that in running down the shutter over this narrow side, a shorter shutter time can be attained.

As already mentioned above, it is not necessary to house the parts of the slit-type shutter in a casing and they can be arranged also on one or more mounting plates. In this case, in order to attain the advantages mentioned in the preceding paragraph, the recesses provided in the camera casing for the shutter parts should be arranged only on one narrow side of the picture window provided likewise in the camera casing.

The organs for opening and closing the picture window can be roller blinds, curtains or slides. However, in order to keep the casing for the slit-type shutter, or the mounting plate, to be inserted in the camera body, as small as possible, it is of particular advantage if the organs which alternately uncover and cover the picture window, consist of conventional rigid slides. It is of advantage if each of the two shutter curtains is composed of several slides which run one after the other.

It has been known previously to form slit-type shutters from more than two rigid slides. In one of these known constructions—in cocked, but closed condition of the slit-type shutter—three rigid slides partly overlapping each other cover the picture window, while three additional rigid slides slid into each other are located on one side, outside of the picture window. In running down the shutter, first the three first mentioned slides move. They uncover the picture window and are subsequently slid into each other on one side of the picture window. The rigid slides which are located on the other side of the picture window and slid into each other, are drawn apart from each other and close the picture window again. Upon setting the shutter, the slide group which ran down first, is moved back to the drawn apart position in which the picture window is covered. Simultaneously, the second group of slides is thereby moved again into the position in which they are slid one upon the other, whereby, however, the picture window is not uncovered.

In a known construction of slotted or focal-plane shutters of this type each of the individual slides is guided in a path provided on both sides of the image aperture. The slides are provided on each side with teeth which are engaged by gears for moving them.

In another slotted shutter of this type each of the individual slides has on its narrow sides flaps and eyelets, by means of which it is in connection with eyelets and flaps provided on adjacent slides. Thus, due to the presence of these guide and control means, the slides are considerably wider than the image aperture so that they need space for their movement on both sides of the image aperture.

By arranging the image aperture according to a specific feature of the present invention in a one-sided manner in the casing for the slotted shutter, or by seating the mounting plate only on one side of the image aperture provided in the camera casing, the lengths of the guide and bearing surfaces provided in one wall of the shutter casing for the light-sensitive layer, are different. It is of advantage to insert the casing for the slotted shutter in a roll film camera in such a manner that the guide and bearing surface which is longer in the direction of the image aperture, be located on the side of the film feed spool. This has simultaneously the additional advantage that the film wound off from the spool has a longer path for straight line guiding prior to its entering the image aperture and, therefore, a favorable balancing of the circular initial stress imparted to it on the spool, is attained.

The guide path extending on one side of the image aperture, for the individual slides of the shutter, can be formed in various manners. According to a preferred embodiment, each of the shutter slides is provided with one or more guide pieces or flaps which are held and guided on one guide rod, or between two guide rods, which are arranged along one side of the image aperture.

In accordance with the principle of the slotted shutter, the slides are divided into two groups, whereby each of the groups has a main slide. In its movement, said slide impinges on the further slide or slides of its group and causes the displacement of the latter. Movement of the main slides is brought about by a draw spring, each main slide or its carrier being engaged by a draw spring, the other end of which is fixed to the shutter casing. It is of advantage to hold only the main slide of each slide group in its cocked position by an arresting device. Upon release of the shutter, the main slide is released and displaced under the effect of a spring, the tension of which is selected in such a manner that it draws this main slide after it impinges on the other slides of its group, together with the latter, up to its end position.

This kind of movement of the slides is of particular advantage because the mass of the main slide is relatively small in comparison to the mass of a conventionally used slotted shutter slide or roller blind. Therefore, the spring acting on the main slide is capable of very strongly accelerating it within a short period of time. Upon impinging on the other slides of its group, in addition to the spring effect, the kinetic energy of the already moving slide or slides also becomes effective so that a slide, the movement of which has to be started, is brought to its operative velocity very quickly. The diagram of a conventional slide shutter or roller blind shutter, shows for the opening slide, as well as for the closing slide, a curve characterized by increasing ascent. Thus, the velocity of movement of each slide is continuously increased and the slides impinge on their end stop with very high velocity. In contrast to this, in the shutter according to the present invention, each main slide impinges against the subsequent slides of its group so that the velocity of the main slide is somewhat braked. Subsequently an acceleration occurs again. The diagram of this multiple-part shutter approaches the exact shape of a parallelogram much closer than the diagram of a conventional slotted shutter having only one opening slide and closing slide. In this manner it is attained that the stage velocity of the subdivided groups comes rather close to uniformity. In particular the starting velocity is higher and this has a favorable influence on the exposure.

For each main slide of the two slide groups which aer provided for, a separate arresting and releasing device is present. The device for the main slide of the group which uncovers the image aperture during exposure, is at the same time the release means for the shutter. However, the arresting and releasing device for the main slide of the slide group which covers the image aperture after the exposure, is operated by the main slide of the leading group which uncovers the image aperture. In order to attain this, a movable stop member—for example the free arm of a double-armed lever—projects into the path of the main slide of the slide group which opens the image aperture and said stop member releases, upon its actuation, the arresting device for the main slide of the slide group for covering again the image aperture. Said movable stop member, which acts over intermediate members, can alternately, either immediately and directly, or after an adjustable period of time over an adjustable retard mechanism, release the arrest of the main slide of the subsequently moving slide group for covering again the image aperture. Depending on the adjustment, it is therefore thus possible to close the image aperture after one full opening either immediately, or after an adjustable period of time. Furthermore, depending on the point, at which the stop member projects into the path of the main slide, the start of movement of the other slide group can be adjusted. It is possible to release the second slide group only when the first slide group has uncovered the image aperture. However, it is also possible to cause movement of the second slide group already at a moment when the image aperture has been only partly uncovered by the first slide group, so that operation of the shutter takes place with slit formation.

According to an advantageous arrangement, the slotted shutter is set in the following manner: to the main slide of the slide group, which uncovers the image aperture during operation, a drawing means, e.g. a rope or chain is fastened, the other end of which is fixedly connected to a drum which is rotatably arranged on the casing of the slotted shutter and can be turned by a handle or the like. Upon turning this drum, this main slide is brought to its cocked position and arrested there. Thereby, the main slide draws the slides of its group from the piled position into a drawn apart position in which they cover the image aperture and simultaneously it pushes the main slide and the slides of the other group from their drawn apart position, in which they cover the image aperture, to the piled, cocked position in which this other slide group is likewise arrested. Setting of the slotted shutter can be brought about also in other manner, for example by fastening to the main slide of the opening group a nut which is engaged by a spindle having a very high pitch and arranged parallel with the guide rods. By turning said spindle, the shutter can be set in the manner already explained above.

It is contemplated according to the present invention, that in building-in the casing containing the shutter parts, or the mounting plate containing the shutter parts, in a photographic camera, the axes of those operating elements of the shutter, which are supposed to cooperate with the camera mechanism, be arranged to project from the shutter casing and, if desired, provided with coupling means, so that they may be coupled, or are automatically coupled with corresponding operating elements arranged within the camera body upon building-in the shutter in the camera. It is thereby of advantage to arrange the axes of all operating members, i.e. the axis of the arresting and releasing device for the slides, the axis of the shutter setting device and the axis of the members for regulation of the movement of slides, i.e. of the device for adjusting the shutter time, parallel to each other in the small box. These axes can be thereby arranged either parallel or in a right angle to the plane of the image aperture. The direction of the axes determines the direction in which the small box, or the mounting plate, is inserted or slid into the camera. By the parallel arrangement of the axes relative to each other, at suitable arrangement in the camera of drive members provided with couplings, in a simple manner a connection can be provided between the operating members of the shutter and the operating handles arranged on the camera. For example, it is possible to couple the setting device for the shutter with the film transport device of the camera.

The appended drawings illustrate by way of example an embodiment of a slotted shutter formed as a complete structural unit, according to the present invention. It will be understood that the invention is not limited to this embodiment.

In the drawings:

Figs. 2-5 illustrate in top plan view the operating parts of the shutter in various positions, whereby Fig. 2 shows the cocked shutter;

Fig. 3 shows the shutter parts in the moment of operation when the image aperture is uncovered;

Fig. 4 shows a shutter after actuation;

Fig. 5 shows the shutter after release and the setting device of the shutter.

Figure 1:
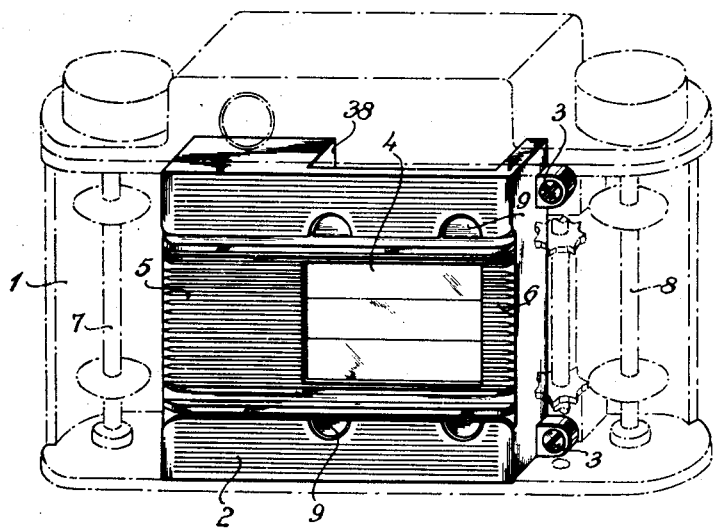
Fig. 1 illustrates in perspective view a casing which contains all parts of the shutter.

Referring now to the drawings in detail, in Fig. 1 reference symbol 1 denotes a photographic camera which is indicated in dotted line and in which a casing 2 containing all operative parts of a slotted shutter is inserted and fixed by means of screws 3. The image aperture 4 is located in a wall of the casing 2. A bearing surface and a guide path are also provided in said wall for a roll film (not shown in the drawing). The image aperture 4 is arranged laterally in casing 2 so that guide path portion 5 is longer than guide path portion 6. Casing 2 is inserted in camera 1 in such a manner that the longer guide path portion 5 is located on the side turned toward the film feed spool 7. The roll film which is fed from said spool and is guided over a perforation roller to the film take-up spool 8, has thereby, prior to its reaching the image aperture 4, a longer guide path so that the initial tension, imparted to the film on the feed spool, is compensated. On the sides of film guide paths 5 and 6 bearing surfaces 9 are provided for a flap of the film pressure plate which is not shown in the drawing. Thereby the film pressure plate can lie against the image aperture 4 in such a manner that a narrow channel is formed between said plate and the guide paths 5 and 6.

The image aperture 4 is opened and closed by rigid slides which are movably guided along one of its narrow sides. In the example altogether six slides are provided. However, more or less slides can also be used.

Figure 2:
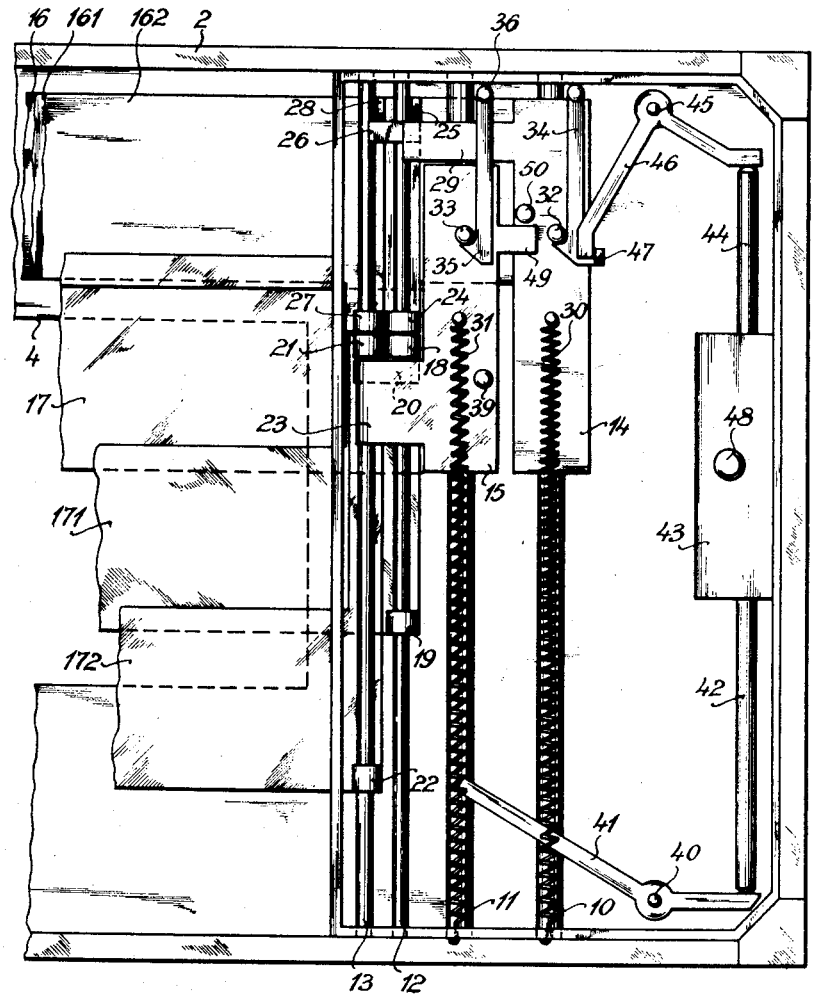

As shown in Figs. 2-5 laterally from the image aperture 4, four guide rods 10, 11, 12 and 13 are fixedly arranged in casing 2. The guide rods can be of round or angular cross-section. On the guide rods 10 and 11, respectively, carriers 14 and 15 are held and guided. To each of these carriers 14 and 15 a main slide 16, 17, respectively, is fastened. In Fig. 2, in which the shutter is shown in set position, the image aperture 4 is covered in lighttight manner by main slide 17 fastened to carrier 15 and slides 171 and 172 which are coordinated to slide 17. Slide 171 is provided with guide means 18 and 19, in which this slide 171 is held on guide rod 12. A flap 20 which is bent near guide piece 18 from slide 171 overlaps guide rod 12 and projects into the range of movement of a guide piece 21 of slide 172, said guide piece 21 being arranged on guide rod 13. Slide 172 is in addition journalled by means of a further guide piece 22 on guide rod 13. Carrier 15 is provided with a stop flap 23, which overlaps guide rods 12 and 13 as well as flap 20 and projects into the range of movement of guide pieces 19 and 22. Main slide 17 forms together with slides 171 and 172 an opening slide group which uncovers the image aperture 4 upon actuation of the shutter.

The closing slide group for covering the image aperture is arranged in a similar manner. It is formed from main slide 16 fastened to carrier 14 and from slides 161 and 162 which are coordinated to slide 16. Slide 161 is slidably held in a guide piece 24 on guide rod 12. Slide 161 is also provided with a guide flap 25 which laterally lies against guide rod 12 and with a flap 26 which overlaps guide rods 12 and 13. Slide 162 is held in a guide piece 27 on guide rod 13. A guide flap 28 provided on slide 162 lies likewise against guide rod 13. Carrier 14 has a stop flap 29 which projects into the range of guide piece 24 and guide flap 25.

Each of carriers 14 and 15 is engaged by a draw spring 30 and 31, respectively, the other end of said springs being fastened to shutter casing 2. Furthermore, an arresting pin 32 and 33 is arranged on each of the carriers 14 and 15, respectively. Lever bolts 34 and 35 tiltably arranged on shutter casing 2 latchingly engage said arresting pins 32 and 33, respectively, in the set position of the shutter. Lever bolt 35 is fastened on a rotatably arranged shaft 36. Said shaft extends through cover plate 37 which—as shown in Fig. 5—covers small box 38 enclosing the operative parts of the shutter (see also Fig. 1).

A stop pin 39, or the like, is also fastened to carrier 15. Into the range of movement of said pin the free arm of a double armed lever 41, which is pivotal about bolt 40, projects. The other arm of said lever lies against a connecting rod 42 which acts on a retarding mechanism 43, which is not shown in detail. Another connecting rod 44, which can be actuated by mechanism 43 is connected with angle lever 46 which is pivotal about a pin 45, or the like, and one arm of which engages behind a bent part 47 on lever bolt 34. Retarding mechanism 43 can be adjusted in such a manner that displacement of connecting rod 42 can act either immediately and directly, or after an adjustable period of time, on connecting rod 44. This adjustment can be brought about by turning shaft 48, which—as shown in Fig. 5— likewise extends through cover plate 37 and projects from shutter casing 2.

Carrier 15 is also provided with a tang 49 which is capable of acting on a driving pin 50 fastened to carrier 14. In addition—as shown in Fig. 5 only—a rope 51, or the like, is also fastened to carrier 15, the other end of the rope being fastened to a drum 52 which is rotatably arranged in shutter casing 2. By turning this drum 52, rope 51 can be wound up thereon, whereby carrier 15 can be displaced against the effect of spring 31. The shaft 53 of drum 52 extends through cover plate 37 and projects therefrom.

The shutter shown in the drawings operates as follows:

Fig. 2 illustrates the shutter in its set position. Carriers 14 and 15 are held by lever bolts 34 and 35— which engage behind their arresting pins 32 and 33— in such a manner that slides 17, 171 and 172 of the opening group cover, in a drawn apart position, in which, however, they still partially overlap each other, the image aperture 4 in lighttight manner, while slides 16, 161 and 162 of the closing group are stacked or collapsed on one longitudinal side of the image aperture.

Figure 3:
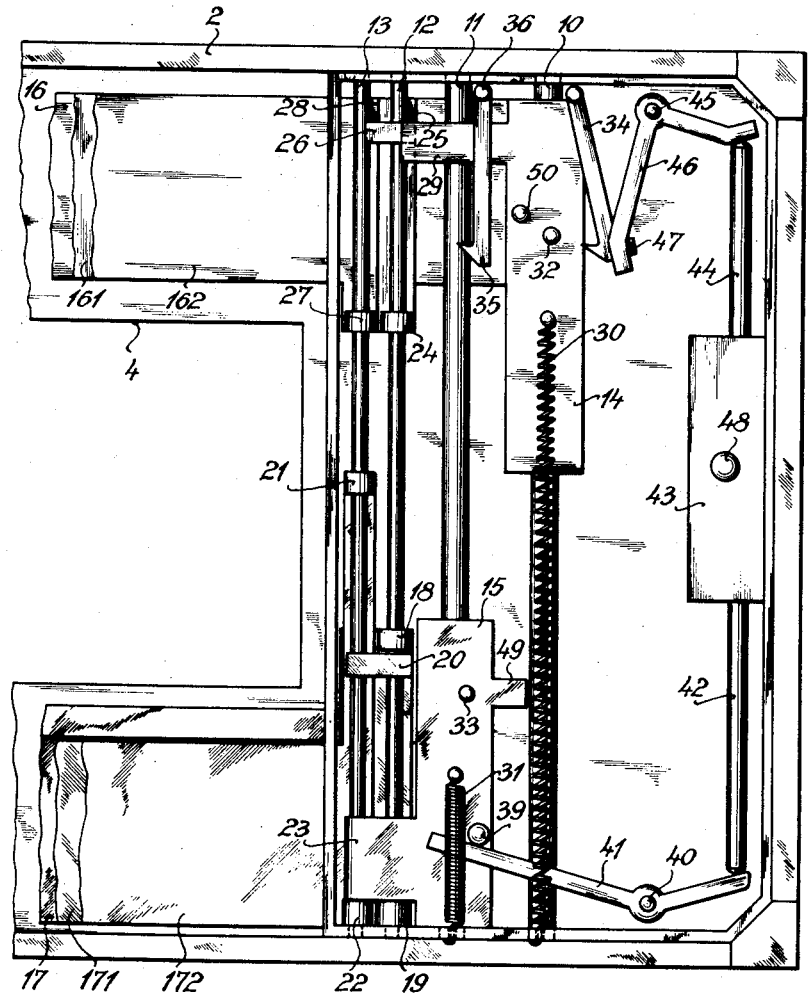
Figure 4:
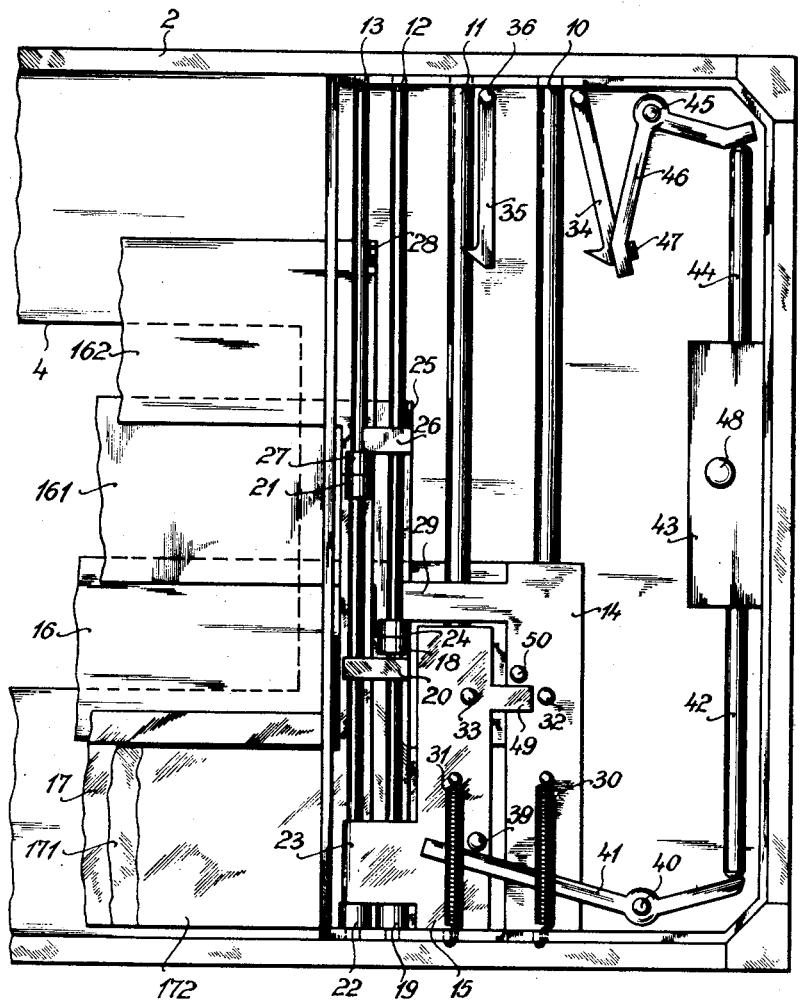

In order to release the shutter, shaft 36 must be turned, whereby lever bolt 35 releases arresting pin 33 and thus also carrier 15 with the main slide 17. Carrier 15 snaps, under the effect of spring 31 on its guide rod 11, in downward direction (in the drawing). Its stop flap 23 impinges thereby successively on guide piece 19 of slide 171 and guide piece 22 of slide 172, whereby these slides 171 and 172 are successively also moved. Carrier 15 stops by impinging on a wall of shutter casing 2, when slides 17, 171 and 172 have uncovered image aperture 4 and are piled one upon the other on one side of the image aperture. However, prior to this, stop pin 39 fastened to carrier 15, has impinged on the free arm of double armed lever 41, whereby the latter has pivoted and thus moved connecting rod 42. Depending on the adjustment of retarding mechanism 43, movement of connecting rod 42 is transmitted either directly and immediately, or after an adjustable period of time, to connecting rod 44. Thereby, the latter causes pivoting of angle lever 46, which in turn releases bolt lever 34 from arresting pin 32 of carrier 14. Fig. 3 illustrates the operative parts of the shutter in this position. Carrier 14 and together with it main slide 16 snap now, under the effect of spring 30, in downward direction. After a short movement, stop flap 29 of carrier 14 impinges on guide piece 24 of slide 161, whereby the latter is likewise moved. Its flap 26 impinges then on guide piece 27 of slide 162, whereby the latter is now likewise moved until carrier 14 stops by its impinging on the wall of casing 2 (on the bottom of the drawing). As shown in Fig. 4, slides 16, 161 and 162 of the closing group which are then drawn apart, but still partly overlap each other, cover the image aperture 4 in lighttight manner. Thereby the main slides 16 and 17 likewise partially overlap each other.

Figure 5 illustrates the position of the shutter parts at the start of setting the shutter.

In order to set the shutter, shaft 53 must be turned, whereby, by means of rope 51 which is wound on drum 52, carrier 15 is moved against the effect of spring 31. Thereby, tang 49, provided on carrier 15, acts on driving pin 50 fastened on carrier 14, so that at the same time carrier 14 too is displaced on its guide rod 10, against the effect of spring 30. Thus, the main slide 16, which moves over image aperture 4, is at the same time followed by main slide 17, which partially overlaps it and thereby covers the slit between them in a lighttight manner. Stop flap 29 on carrier 14 impinges during the setting step on guide flap 25 of slide 161, so that this slide 161 is also moved. Its flap 26 contacts during the further setting guide flap 27 of slide 162, whereby this slide 162 is likewise moved. At the same time, slides 171 and 172 are also moved due to the fact that stop flap 23 of carrier 15 impinges on guide piece 18 of slide 171 and, subsequently, flap 20 provided on slide 171, impinges on guide piece 21 of slide 172. The setting motion ends when carrier 14 abuts against the upper wall in the drawing, of shutter casing 2. In this position, lever bolts 34 and 35 automatically engage behind arresting pins 32 and 33 of carriers 14 and 15. The shutter parts are then again in the position illustrated in Fig. 2.

As will be understood from Fig. 5, shaft 36 for lever bolt 35, which serves for releasing operation of the shutter, shaft 53 for the shutter-setting device and shaft 48 for the time adjustment of the retarding mechanism, are aligned parallel to each other and also to the axis of the image aperture and they project in parallel directions from shutter casing 2. These shafts 36, 53 and 48, can be provided with coupling means, e.g. a conventional frontally engaging coupling, the coupling counter parts of which are provided on shafts arranged at a corresponding point in the camera body. Upon insertion of the slotted shutter in the camera body, in a simple manner coupling with operative parts of the camera can thus be obtained. For example, shaft 36 can be connected with a shutter release device arranged in the camera body. Shaft 53 can be coupled with the film transport mechanism of the camera in such a manner that upon transporting the film, at the same time the shutter is set. With a member for the adjustment of shutter times, which is arranged on the camera body, shaft 48 of the retarding mechanism can be coupled.

In the example shown, movement of the closing slide group 16, 161 and 162 is not released before image aperture 4 has been uncovered by the opening slide group 17, 171 and 172. By changing the place at which lever 41 projects into the path of stop pin 39, which is fastened on carrier 15, an earlier release of the closing slide group can be attained, so that operation of the shutter can take place with slit formation.

All operating parts of the shutter are housed in the small box-shaped container 38, which is arranged laterally of the image aperture. The wall which limits container 38 toward the side of the image aperture, is provided with a slot-like recess, through which the slides protrude into the range of image aperture 4. The free ends of these slides overlap the image aperture only to the extent which is necessary for its safe, lighttight sealing.

It will be understood from the above that this invention is not limited to the parts, designs, steps and arrangements specifically described above and illustrated in the drawings and can be carried out with various modifications without departing from the scope of the invention, as defined in the appended claims.

What is claimed is:

1. Shutter operating mechanism for a still camera comprising, in combination, a wall formed with an image aperture therein; leading and trailing shutters movable in succession across said image aperture; a plurality of relatively elongated guide rods mounted adjacent and substantially parallel to said wall and to one side of said aperture, said rods being in spaced parallel relation to each other and to the direction of movement of said shutters; each shutter including plural flat substantially uniplanar overlapping plates constituting a main slide and at least one supplemental slide, the slides extending substantially parallel to said wall; the slides of each shutter, when the shutter is extended, completely blocking the aperture, and being stacked beyond said aperture when the shutter is collapsed; the leading shutter being extended and the trailing shutter collapsed in such set position, and the leading shutter being collapsed and the trailing shutter being extended in such operating position; a first carrier slidably mounted on a first one of said guide rods, the leading main slide being secured to said first carrier; first spring means biasing said first carrier to the shutter operated position; each supplemental slide having mounting means slidable along others of said guide rods and spaced longitudinally of the respective guide rods; a second carrier slidably mounted on a second one of said guide rods adjacent said first one of said guide rods, the trailing main slide being secured to said second carrier; second spring means biasing said second carrier to the shutter operated position; each trailing supplemental slide having spaced mounting means slidable along others of said guide rods and spaced longitudinally of the respective guide rods; said first carrier having a first lug projecting between and engageable with the spaced mounting means of each supplemental slide, and a second lug extending into the path of movement of a projection on said second carrier; a first pivoted latch engaged with a third lug on said first carrier and retaining the leading shutter in the extended position, said first latch being operable by the shutter release means to disengage said third lug for movement of the leading main slide across the image aperture by said first spring means; said first lug striking a mounting means of each leading supplemental slide to move the latter across the image aperture to collapse the leading shutter in the operated position; said second carrier having a first lug projecting between and engageable with the spaced mounting means of each trailing supplemental slide; a second pivoted latch engaged with a second lug on said carrier and retaining the trailing shutter in the collapsed position; an operating lever pivoted intermediate its ends and having a first arm in the path of movement of an operating lug on said first carrier for direct engagement thereby when the main slide of said leading shutter reaches the shutter operated position; operating rod means mounted for slidable reciprocation parallel to said guide rods; said operating lever having a second arm engaged with one end of said operating rod means; means operatively connecting said second latch to the opposite end of said operating rod means and effective, upon reciprocation of the latter by rocking of said operating lever by said operating lug, to operate said second latch to release said second carrier for movement of the trailing main slide over the aperture by said second spring means; the first lug on said second carrier striking a mounting means of each leading supplemental slide to move the latter across the image aperture; setting means connected to said first carrier and effective, when operated, to move said first carrier to the set position, said first lug on said first carrier effecting movement of each leading supplemental slide into extended relation blocking said image aperture; said second lug on said first carrier engaging the projection on said second carrier to move the trailing main slide to the set position; said first lug on said second carrier engaging a mounting means of each supplemental trailing slide to move the latter out of blocking relation with the image aperture and into stacked relation with the main leading slide.

2. Shutter operating mechanism as claimed in claim 1 in which each shutter includes, as supplemental slides, an intermediate slide and a trailing slide.

3. Shutter operating mechanism as claimed in claim 1 in which said operating rod means has operatively included therein retarding mechanism effective to adjustably delay the operation of said second latch responsive to rocking of said operating lever.

4. Shutter operating mechanism as claimed in claim 1 in which each of said latches has a bevelled nose engaged by the associated latching lug upon movement of the respective carriers to the shutter set position to swing said latches out of the path of movement of said latching lugs; the latches engaging behind the latching lugs after the latter have passed over said bevelled noses.

References Cited in the file of this patent

UNITED STATES PATENTS

| | | |
|---|---|---|
| 2,058,506 | Riddell | Oct. 27, 1936 |
| 2,090,390 | Kuppenbender | Aug. 17, 1937 |
| 2,267,794 | Kosken | Dec. 30, 1941 |
| 2,418,644 | Hutchinson | Apr. 8, 1947 |
| 2,664,800 | Mayo | Jan. 5, 1954 |

FOREIGN PATENTS

| | | |
|---|---|---|
| 848,741 | Germany | May 6, 1954 |